United States Patent [19]

Fanciullo

[11] 4,046,956
[45] Sept. 6, 1977

[54] PROCESS FOR CONTROLLING THE OUTPUT OF A SELECTIVE OXIDIZER

[75] Inventor: Salvatore Fanciullo, Plainville, Conn.

[73] Assignee: United Technologies Corporation, Hartford, Conn.

[21] Appl. No.: 690,824

[22] Filed: May 27, 1976

[51] Int. Cl.² .............................................. H01M 8/06
[52] U.S. Cl. ......................................... 429/20; 429/24
[58] Field of Search .................. 429/24; 423/247, 20

[56] References Cited

U.S. PATENT DOCUMENTS

| | | | |
|---|---|---|---|
| 1,923,865 | 8/1933 | Handforth | 423/404 |
| 2,650,154 | 8/1953 | Anderson | 423/574 |
| 3,216,782 | 11/1965 | Cohn | 423/247 |
| 3,585,077 | 6/1968 | Waldman | 429/24 |
| 3,663,162 | 5/1972 | Randhava | 423/247 |

Primary Examiner—John H. Mack
Assistant Examiner—H. A. Feeley
Attorney, Agent, or Firm—Stephen E. Revis

[57] ABSTRACT

The output from a selective oxidizer is controlled by modifying the rate of oxidant input in accordance with the operating temperature of the selective oxidizer. In a preferred embodiment, wherein the selective oxidizer has a slow temperature response, gross adjustments to the oxidant feed flow rate are made as a function of the fuel feed flow rate into the selective oxidizer, in addition to the fine adjustments made as a function of temperature.

1 Claim, 2 Drawing Figures

PROCESS FOR CONTROLLING THE OUTPUT OF A SELECTIVE OXIDIZER

BACKGROUND OF THE INVENTION

1. Field of the Invention

This invention relates to a control system for a selective oxidizer.

2. Description of the Prior Art

A selective oxidizer is a well-known device used to reduce the level of carbon monoxide in a gas stream. For example, it is often used in combination with fuel cells to clean the reactant gas fed to the cells since carbon monoxide poisons the cells by reducing the activity of the cell catalyst.

A typical fuel cell uses phosphoric acid as the electrolyte and operates on air as the oxidant and hydrogen as the fuel. To produce economical power on a large scale, fuel cell power plants must utilize inexpensive hydrocarbon fuels. These fuels must be converted to relatively clean hydrogen in order to obtain good fuel cell performance and long life. Often the initial fuel processing step is steam reforming to produce hydrogen and which is accomplished in a package outside the fuel cell called the reformer. The output gas from the reformer may include on the order of 10% carbon monoxide. This gas may then be further processed to produce additional hydrogen and reduce the carbon monoxide content by using a shift converter. The shift converter output may contain one or two percent carbon monoxide. Even this small amount of carbon monoxide may be unacceptable in a fuel cell where long life is an important criterion. A selective oxidizer is used to further decrease the carbon monoxide content to a tolerable level, on the order of about 0.1% carbon monoxide.

In the selective oxidizer, oxygen, usually in the form of air, is introduced into a catalyst bed along with the fuel being processed. A typical catalyst is platinum supported on aluminum or on carbon. Other noble metal catalysts may be used, but platinum is preferred. The carbon monoxide and oxygen react in the presence of platinum, converting the carbon monoxide to carbon dioxide in a controlled combustion process according to the following reaction:

$$2CO + O_2 \rightarrow 2CO_2 + \text{heat} \quad (1)$$

If there is not enough oxygen with which the carbon monoxide can react the CO output from the selective oxidizer will be too high; if too much oxygen is introduced into the selective oxidizer then the hydrogen in the fuel stream will react with the recess oxygen to produce water according to the following formula:

$$2H_2 + O_2 \rightarrow 2H_2O + \text{heat} \quad (2)$$

This latter reaction is undesirable since it reduces the hydrogen content of the fuel stream.

The ideal approach to controlling the selective oxidizer would be to measure the carbon monoxide content in the effluent gas and adjust the input oxygen (air) flow rate proportionally to reduce the carbon monoxide level. This cannot be done since rapid CO detectors (analyzers) are not known. Conventional methods of detecting carbon monoxide, by the use of gas chromatographs, would impose a significant time delay to the process and proper control would not be attained. Further, gas chromatograph equipment is large, expensive, and not suitable for incorporation into a fuel cell power plant.

SUMMARY OF THE INVENTION

It is an object of the present invention to provide a novel method of controlling the composition of the output of a selective oxidizer.

A more particular object of the present invention is a method for minimizing the carbon monoxide output from the selective oxidizer while simultaneously minimizing the amount of hydrogen consumed within the selective oxidizer.

In accordance with the invention, the temperature within the selective oxidizer is sensed and, in accordance with a predetermined temperature schedule, is utilized to regulate the flow of an oxidant into the selective oxidizer. In one embodiment further control is obtained by biasing the oxidant feed flow to the oxidizer as a function of the fuel feed flow to the oxidizer. In a fuel cell system the oxidant feed flow can be biased as a function of the fuel feed flow rate into the selective oxidizer. Since the fuel feed flow rate is a direct function of the current output of the fuel cell, the oxidant feed flow may instead be biased as a function of the current output.

As discussed in the Background of the Invention, two different reactions may take place within the selective oxidizer, one being the production of carbon dioxide from carbon monoxide and oxygen, which is desirable, and the other being the production of water from the combination of hydrogen and oxygen, which is undesirable. Several factors will determine the extent to which each of these reactions occur. One factor is the selectivity of the catalyst. The device in question is called a selective oxidizer for the reason that it selectively oxidizes one constituent in the gas stream rather than or much more readily than other constituents. Platinum is an excellent catalyst in this regard since it favors the former reaction much more than the latter.

Another factor which influences the reactions taking place within the selective oxidizer, and with which the present invention is particularly concerned, is the amount of oxygen present in the bed relative to the amount of carbon monoxide passing through the bed in the fuel. If more oxygen is fed to the selective oxidizer than is needed to react with the carbon monoxide, the excess oxygen will react with the hydrogen in the fuel to produce water plus heat. If the temperature within the selective oxidizer increases above a certain level it is an indication that too much hydrogen is being consumed. It has been discovered that if the oxygen input is controlled as a function of the selective oxidizer temperature, carbon monoxide output can be minimized and controlled during selective oxidizer operation with minimum hydrogen consumption.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
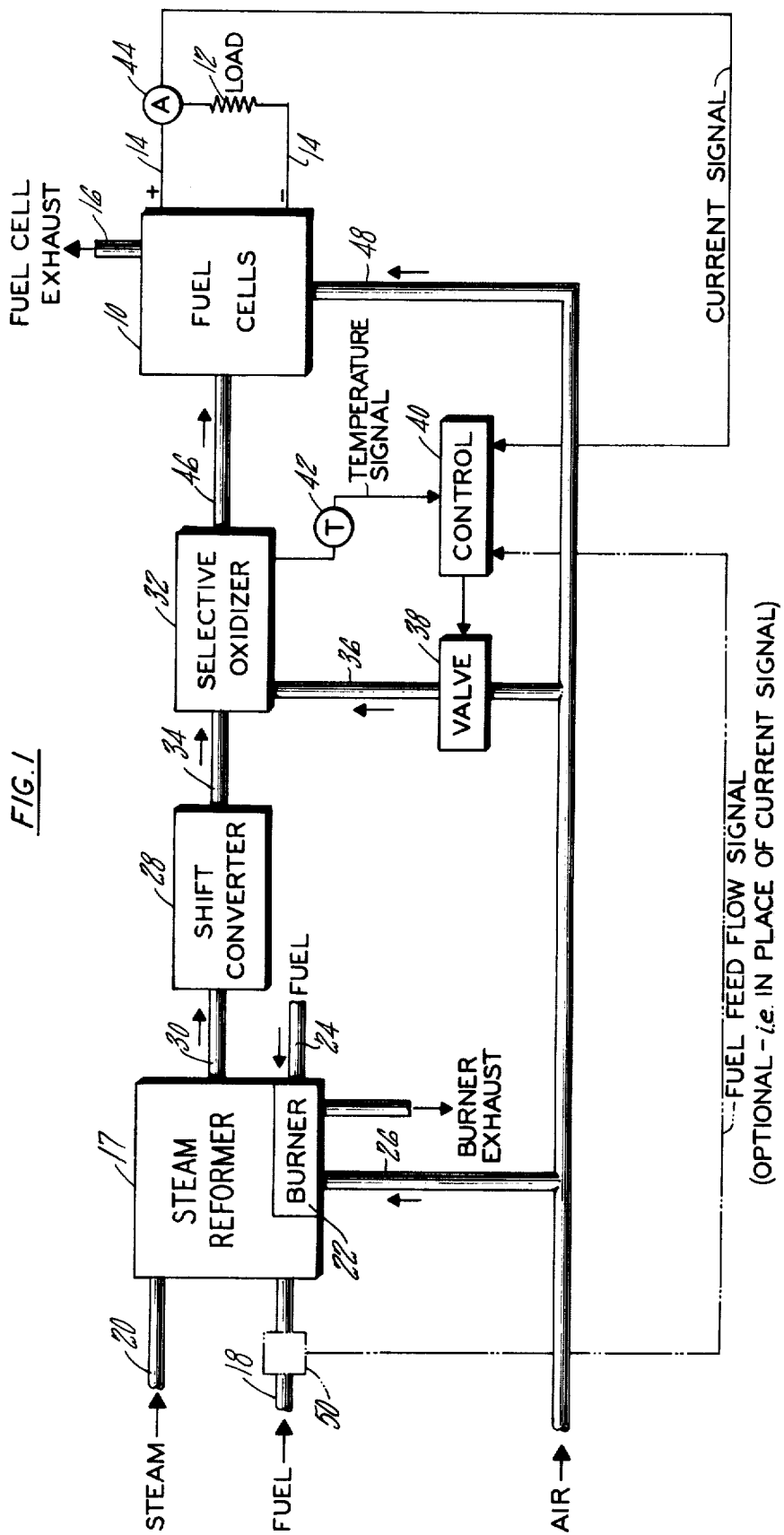
FIG. 1 is a schematic view of a fuel cell system utilizing the method of control of the present invention.

Referring to FIG. 1, a fuel cell system embodying the features of the present invention is shown in diagrammatic form. A stack of fuel cells 10 comprises a plurality of cells connected electrically in series to each other and to a load 12. Electrons generated in the fuel cells are made available to the load 12 through output leads 14. Although not shown, each cell in the stack 10 includes a pair of electrodes spaced from each other by phosphoric acid electrolyte retained in a suitable matrix material; plates separate the cells from one another and define reactant gas passageways on the nonelectrolyte sides of each electrode. Although the depleted reactant gases are shown exhausting from the stack via a single conduit 16, this is merely for the purpose of simplicity since the more common fuel cells stacks include separate exhaust streams for the oxidant and fuel.

As heretofore discussed, it is desirable to use inexpensive hydrocarbon fuels which must be converted to hydrogen and cleaned of substances which are deleterious to the cells. A stream reformer 16 is commonly used to produce hydrogen from these fuels. For the purposes of this preferred embodiment it will be a assumed that the raw fuel is natural gas, but other fuels may also be used such as propane, methane, naptha and heating oils. The fuel is shown being introduced into the reformer 16 via a conduit 18. The amount of fuel flow into the stream reformer 17 is generally controlled by the current output of the stack 10. This control mechanism is not shown in the drawing since it is not critical to the present invention and would be well known to those with ordinary skill in the art. A suitable amount of steam is shown entering the reformer 17 via a conduit 20. Although not shown, it is often desirable to premix the fuel and steam and to introduce the mixture into the reformer. The reformer 17 includes a burner 22 provided with fuel via a conduit 24 and air via a conduit 26. The burner provides heat for the steam reforming reaction. The fuel may be the same fuel as is used in the steam reformer, or it may be unburned hydrogen from the fuel cell exhaust conduit 16; this is not important to the present invention. In the reformer the basic reaction is as follows:

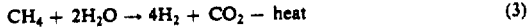

$$CH_4 + 2H_2O \rightarrow 4H_2 + CO_2 - heat \quad (3)$$

The reformer output is fed into a shift converter 28 via a conduit 30. Having assumed that the raw fuel is natural gas, a typical composition for the reformer output might be 55% $H_2$ + 8% Co + 7% $CO_2$ + 2% $CH_4$ + 28% $H_2O$.

In the shift converter carbon monoxide plus water combine to produce carbon dioxide, additional hydrogen, and heat according to the following equation:

$$CO + H_2O \rightarrow H_2 + CO_2 + heat \quad (4)$$

The shift converter output is fed into the selective oxidizer 32 via a conduit 34 and might have the following typical composition: 62% $H_2$ + 1% CO + 14% $CO_2$ + 2% $CH_4$ + 21% $H_2O$.

Air enters the selective oxidizer 32 via a conduit 36, passing first through a valve 38 which is operated by a control 40. In this preferred embodiment the selective oxidizer catalyst bed is platinum supported on alumina oxide ($Al_2O_3$). A sensor 42 measures the operating temperature of the selective oxidizer and sends a signal to the control 40. An ammeter 44 measures the current output of the stack 10 and sends a current signal to the control 40. During steady state operation of the stack 10 the position of the valve 38 is simply a function of the temperature signal to the control 40. If the operating temperature of the oxidizer increases above a preselected maximum temperature it means that too much air (i.e., oxygen) is being admitted to the oxidizer since the excess oxygen is reacting with the hydrogen in the fuel stream to produce water plus heat according to equation (2). In that instance the control 40 reduces the air flow through the valve 38 until the temperature is below the preselected maximum. If the temperature decreases below a preselected minimum it means that there is an insufficient amount of oxygen to react with the carbon monoxide, and the control 40 will open the valve 38 to permit more air to flow into the oxidizer. Thus, during steady state conditions, by keeping the oxidizer operating temperature between a known minimum and maximum, the amount of carbon monoxide in the selective oxidizer output is kept within acceptable limits, while the hydrogen consumption is minimized. When operating properly the output from the selective oxidizer may have the following composition: 61.5% $H_2$ + 0.1% CO + 14.9% $CO_2$ + 2% $CH_4$ + 21.5% $H_2O$. This is fed to the stack 10 via a conduit 46 along with air via a conduit 48.

Assuming fuel flow to the reformer 17 is suddenly increased as a result of an increased current output, the mass flow of fuel through the selective oxidizer catalyst bed will also increase. The incoming fuel has a low temperature relative to the operating temperature of the selective oxidizer, and, if the oxidizer is relatively small the oxidizer operating temperature will decrease rapidly. The control 40 will quickly open the valve 38 to increase the air flow to the oxidizer thereby providing additional oxygen for the additional carbon monoxide now flowing therethrough. The opposite will occur if the fuel feed flow is reduced.

Generally, however, the selective oxidizer is relatively large, and for that reason its temperature response is not particularly rapid. Thus, an increase in the fuel flow will not result in an immediate or very quick decrease in temperature. Therefore, if the control 40 is only responsive to temperature it will not immediately provide the extra oxygen needed to react with the additional CO flowing through the oxidizer. This means that the output from the selective oxidizer may have more carbon monoxide than is considered safe for the fuel cells. On the other hand, a reduction in fuel flow will mean excess oxygen in the bed, resulting in a reaction of that excess oxygen with the hydrogen to produce water plus heat. Although the oxidizer operating temperature will slowly increase or decrease, as the case may be, and the control 40 will eventually increase or decrease the amount of oxygen admitted to the bed until the temperature levels are within the desired range, during the interim the oxidizer output may include excess CO or be somewhat deficient in hydrogen. The fuel cell system of FIG. 1 includes means for overcoming this problem. As shown, the control 40 receives a current signal from the ammeter 44. Since the fuel feed flow rate respond immediately to a change in current, during transient the current signal biases the air flow rate to provide a virtually instant response of the valve 38 to any change in fuel feed flow rate. The new air flow rate is simply a predetermined estimate of the correct amount of air that will be needed for the new fuel feed flow rate. If the estimate is correct, the air and fuel flows through the selective oxidizer will be in proper ratio such that there will be no or little tendency for the oxidizer temperature to change (i.e., if the temperature was proper before the current output was altered, it will be proper immediately after the alteration). On the other hand, if the estimate was not quite correct, the temperature within the selective oxidizer will change accordingly, and the air flow will be adjusted by the control 40 in accordance with the temperature signal to force the temperature into the proper temperature band. Thus the current signal provides a gross adjustment of the air flow, while the temperature signal provides a fine adjustment.

The control 40 and the valve 38 may, for example, operate pneumatically. In that case the valve 38 may be a Model No. 8000 temperature control valve from Jamesbury Corporation, Worcester, Mass., with a pneumatic actuator and valve positioner; the control 40 may comprise, in combination, a pair of controllers Model No. 528 from Moore Products Company, Spring House, Pa., one being used as a primary controller (temperature responsive) and the other being used as a secondary controller (current responsive). The temperature signal is converted to a pneumatic signal by suitable apparatus well known to persons having ordinary skill in the art. This signal is received by the primary controller which has been preset with a reference pressure which represents the desired operating temperature of the selective oxidizer. The current signal from the ammeter 44 is also converted to a pneumatic signal by suitable apparatus well known to persons having ordinary skill in the art. This current responsive pneumatic signal is sent to the secondary controller. The primary and secondary controllers are operably associated with each other, in a manner which would be well known to persons having ordinary skill in the art, to provide an appropriate pneumatic signal to the valve 38 in accordance with the teachings of the present invention.

Figure 2:
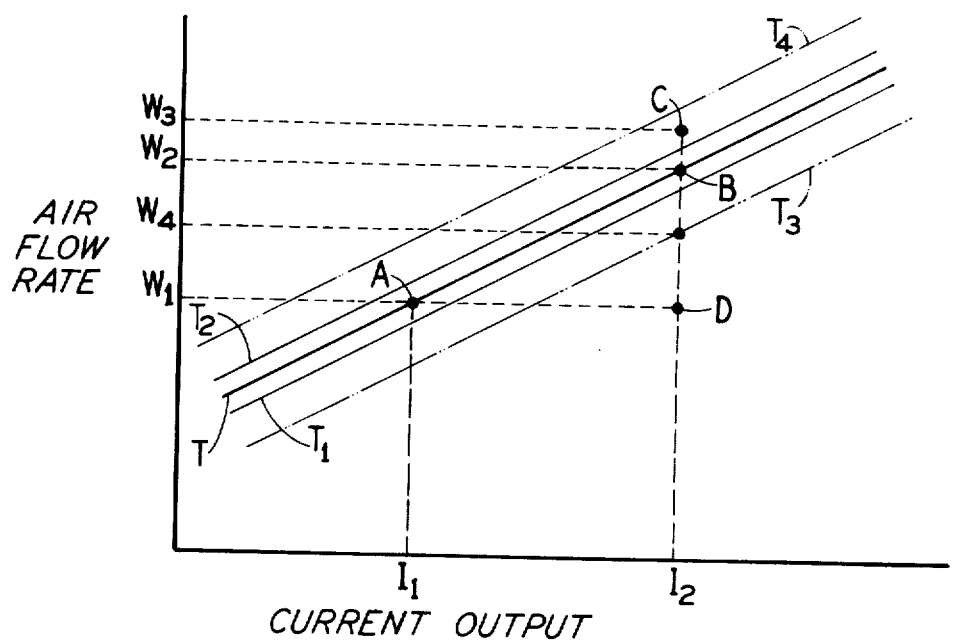
FIG. 2 is a graphical representation of the effect of fuel cell current output on the air flow to a selective oxidizer.

FIG. 2 graphically illustrates how the control system works. The curve labeled T represents the desired operating temperature within the selective oxidizer. The curves above T represent higher temperatures and below T represent lower temperatures. As hereinabove mentioned, if the temperature responsive controller is pneumatic, it is preset with a reference pressure representing the temperature T. During steady state operation, if the temperature exceeds $T_4$ or falls below $T_3$ the selective oxidizer output will either be unacceptably deficient in hydrogen or have an unacceptable excess of carbon monoxide, respectively. These are the outside temperature limits which should never be reached. $T_1$ and $T_2$ are the preselected minimum and maximum temperatures for the control 40; actually they represent the imprecision of the controller which will be insensitive to temperature fluctuations within a narrow band around T. If the temperature falls outside this $T_1$, $T_2$ band the control 40 immediately modifies the air flow rate until the temperature returns within the band. In the above described embodiment wherein the catalyst bed is platinum supported on alumina oxide and the fuel is natural gas, T may be 350° F. A controller such as the Moore Products controller discussed above is preset at 350° F, but may be insensitive to temperature changes within about 10° F of the preset temperature T; thus $T_1$ and $T_2$ would be 340° F and 360° F, respectively. $T_3$ and $T_4$ may be, for example, 325° F and 375° F, respectively.

For the purposes of explanation, assume that the selective oxidizer has a slow temperature response and that the oxidant or air flow is not biased by a current output. Further assume that the system is operating at steady state conditions at point A, corresponding to a current output $I_1$ and an air flow rate $W_1$. Now assume that the current output suddenly jumps to $I_2$. If the control 40 is not responsive to current output, the air flow rate will initially remain at $W_1$, even through the fuel flow rate has suddenly increased to correspond to the new current output $I_2$. Thus, initially, there will not be enough oxygen to react with the carbon monoxide in the fuel, and the oxidizer effluent may contain unacceptable levels of carbon monoxide. The oxidizer temperature will, however, begin to move toward operating point D. As soon as the temperature falls below $T_1$ the control 40 will increase the air flow rate and thus prevent the temperature from dropping below $T_3$. This will continue until operating point B is reached. However, until the air flow rate reaches $W_4$, the selective oxidizer effluent will contain an excess of carbon monoxide.

On the other hand, if the control 40 is also responsive to the current output, when the current output jumps to $I_2$ the control 40 will immediately modify the air flow rate according to a predetermined schedule. If this schedule sets the air flow rate at $W_3$, the selective oxidizer will begin rising in temperature toward operating point C. As soon as the temperature exceeds $T_2$ the control 40 will cut back the air flow rate to prevent the temperature from exceeding $T_4$. This will continue until operation is at point B. It is apparent that even if the oxidizer temperature response is very slow, operating conditions at point C are still within acceptable limits.

As hereinabove discussed, the fuel feed flow rate to the steam reformer 17 is a direct function of the current output. Therefore, the control 40 may be responsive to a fuel feed flow signal in place of the current signal for biasing the oxidant flow rate. This option is shown using phantom lines in FIG. 1. A fuel flow meter 50 is shown disposed in the steam reformer fuel feed conduit 18, and sends a fuel feed flow signal to the control 40. The meter 50 could just as well be disposed in either conduit 30 or 34. If the selective oxidizer was not used in a fuel cell system, such as if it were used in a plant designed to produce and store hydrogen for future consumption, the fuel feed flow rate would naturally be the signal used to bias the oxidant flow rate.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In an improved method of controlling the composition of the output from a selective oxidizer in a fuel cell system, the fuel cell system including a steam reformer, a shift converter, a selective oxidizer and a fuel cell, the method including the steps of supplying a hydrocarbon fuel and steam to the steam reformer, steam reforming the hydrocarbon fuel, conveying the steam reformed fuel to the shift converter, shift converting the steam reformed fuel, conveying the shift converted fuel to the selective oxidizer, supplying air to the selective oxidizer, conveying the output of the selective oxidizer to the fuel cell, and supplying air to the fuel cell, the improvement comprising:
  sensing the operating temperature of the selective oxidizer;
  sensing the current output of the fuel cell;
  maintaining the operating temperature of the selective oxidizer within a narrow band selected to simultaneously minimize hydrogen consumption and maximize the conversion of carbon monoxide to carbon dioxide in the selective oxidizer by controlling the flow rate of the air to the selective oxidizer as a function of the operating temperature of the selective oxidizer and by biasing the flow rate of air to the selective oxidizer as a function of the current output of the fuel cell.

* * * * *